United States Patent
Faulhammer et al.

(10) Patent No.: US 6,420,045 B1
(45) Date of Patent: Jul. 16, 2002

(54) MULTILAYER STRUCTURE COMPRISING A MATERIAL COVERED WITH A COPOLYMER HAVING POLYAMIDE BLOCKS AND HYDROPHILIC BLOCKS

(75) Inventors: Heike Faulhammer, Bernay; Yves Aubert, Menneval; Thierry Briffaud, Bernay, all of (FR); Hermann Josef Hilgers, Bonn (DE); Didier Roumilhac, Serquigny (FR)

(73) Assignee: Atofina, Paris (FR)

( * ) Notice: Subject to any disclaimer, the term of this patent is extended or adjusted under 35 U.S.C. 154(b) by 0 days.

(21) Appl. No.: 09/582,322
(22) PCT Filed: Dec. 23, 1998
(86) PCT No.: PCT/FR99/02860
§ 371 (c)(1), (2), (4) Date: Jun. 23, 2000
(87) PCT Pub. No.: WO99/33659
PCT Pub. Date: Jul. 8, 1999

(30) Foreign Application Priority Data

Dec. 24, 1997 (FR) .............................. 97 16533

(51) Int. Cl.⁷ .............................. B32B 27/08
(52) U.S. Cl. .............................. 428/474.4; 428/474.9; 428/475.2; 428/476.3; 428/479.3; 428/479.6; 428/349; 528/310; 528/322; 528/332; 528/335; 528/336
(58) Field of Search .............................. 528/310, 322, 528/332, 335, 336; 428/474.4, 349, 474.9, 475.2, 476.9, 479.3, 479.6

(56) References Cited

U.S. PATENT DOCUMENTS

| 4,361,680 A | | 11/1982 | Borg | |
|---|---|---|---|---|
| 4,368,090 A | * | 1/1983 | Mumcu et al. | ............. 156/283 |
| 4,483,975 A | * | 11/1984 | de Jong et al. | ............. 528/288 |
| 4,698,242 A | | 10/1987 | Salerno | |
| 4,820,796 A | | 4/1989 | Suzuki | |
| 5,489,667 A | | 2/1996 | Knipf | |
| 5,886,098 A | * | 3/1999 | Ueda et al. | ................... 525/66 |

FOREIGN PATENT DOCUMENTS

| DE | 32 47 755 | 6/1984 |
|---|---|---|
| DE | 195 22 333 | 12/1995 |
| EP | 030 589 | 6/1981 |
| EP | 303 489 | 2/1989 |
| EP | 613 919 | 7/1994 |
| EP | 810 077 | 12/1997 |
| EP | 504 784 | 9/1998 |

OTHER PUBLICATIONS

Patent Abstracts of Japan vol. 013, No. 060 (M–796) Feb. 10, 1989 &jp63 264348.
Database WPI Section CH, Week 9531 &JP 07 145368 Sanyo Chem Ind Ltd) Jun. 6, 1995.
Database WPI Section CH, Week 9445 & JP 06 287547 Sanyo Chem Ind Ltd.

* cited by examiner

Primary Examiner—James J. Seidleck
Assistant Examiner—Melanie Bissett
(74) Attorney, Agent, or Firm—Millen, White, Zelano & Branigan, P.C.

(57) ABSTRACT

The present invention relates to a multilayer structure comprising a material covered with a copolymer having polyamide blocks and hydrophilic blocks where the copolymer has a melting point of less than 135° C.

24 Claims, No Drawings

MULTILAYER STRUCTURE COMPRISING A MATERIAL COVERED WITH A COPOLYMER HAVING POLYAMIDE BLOCKS AND HYDROPHILIC BLOCKS

The present invention relates to a multilayer structure comprising a material covered with a copolymer having polyamide blocks and hydrophilic blocks. It is, for example, a nonwoven coated with copolymers having polyamide blocks and hydrophilic blocks.

These copolymers having polyamide blocks and hydrophilic blocks have a melting point of less than 135° C. and are very fluid in the melt. They consist, for example, of blocks of carboxylic-acid-terminated lauryllactam oligomers which are then condensed with a polyether diol such as polyethylene glycol. The Applicant has discovered that nonwovens could be coated with these copolymers in order to obtain an impermeable-breathable material, i.e. one which is a barrier to liquid water but which is permeable to water vapour.

The prior art EP 688826 has described impermeable-breathable films essentially consisting of copolymers having polyamide blocks and polyether blocks which could be hot laminated directly to nonwovens in order to obtain adhesion. These films may also be adhesively bonded to nonwovens or any other substrate. The adhesive is placed in spots, or in stripes in order not to impair the breathability. It has now been discovered that it is much simpler to cover the nonwoven with copolymers having polyamide blocks and hydrophilic blocks in the melt.

After cooling, a material is obtained which has the same properties as that of the prior art, that is to say of the impermeable-breathable film laminated or adhesively bonded to the nonwoven.

An advantage of the structure of the invention is the simplicity of manufacture compared with the hot-laminated or adhesively bonded film. Another advantage of the invention is the stability of this structure in a wet environment, while a film hot-laminated or adhesively bonded to a nonwoven has a tendency to separate from the nonwoven if the adhesive bonding or the laminating has not been carried out carefully.

The material may be based on cellulose, such as paper, board, a nonwoven consisting of cellulose fibres or a nonwoven based on polyolefin fibres.

The material may be a woven or a nonwoven.

The woven may be any woven used in the textile industry, particularly for clothing, for example cotton, polyamide or polyester. The nonwoven is generally based on fibres of a homopolymer or copolymer polyolefin, such as, for example, polyethylene, polypropylene or ethylene-alkyl (meth)acrylate copolymers.

The copolymers having polyamide blocks and hydrophilic blocks have a melting point of less than 135° C. and Preferably between 90 and 135° C. They are melt-deposited on the material and then, by cooling, the structure of the invention is obtained. The melting point is determined by DSC, (Differential Scanning Calorimetry). They may be deposited on the material by extrusion.

The fluidity of the copolymers must be sufficient to be able, in the melt, to easily cover the material and form a structure which does not delaminate.

Advantageously, the inherent viscosity of the copolymers in solution is between 0.8 and 1.75. This relative viscosity is measured as a 0.5% solution in metacresol using an Ostwald viscometer.

The hydrophilic blocks are defined as products that can absorb at least 50% of their weight in equilibrium with liquid water.

Advantageously, these are polyethers having a sufficient proportion of PEG units —($C_2H_4$—O)— in order to make them hydrophilic.

The polymers having polyamide blocks and Polyether blocks result from the copolycondensation of polyamide blocks having reactive end groups with polyether blocks having reactive end groups, such as, inter alia:

1) Polyamide blocks having diamine chain ends with Polyoxyalkylene blocks having dicarboxylic chain ends;
2) Polyamide blocks having dicarboxylic chain ends with Polyoxyalkylene blocks having diamine chain ends, obtained by cyanoethylation and hydrogenation of aliphatic dihydroxylated alpha,omega-polyoxyalkylene blocks, called polyether diols;
3) Polyamide blocks having dicarboxylic chain ends with polyether diols, the products obtained being, in this special case, Polyetheresteramides.

The copolymers of the present invention are those advantageously described in point 3).

The polyamide blocks having dicarboxylic chain ends derive, for example, from the condensation of alpha,omega-aminocarboxylic acids of lactams or of dicarboxylic acids with diamines in the presence of a chain-limiting dicarboxylic acid.

According to a first preferred embodiment of the invention, the polyamide blocks result, for example, from the condensation of one or more alpha,omega-aminocarboxylic acids and/or of one or more lactams having from 6 to 12 carbon atoms in the presence of a dicarboxylic acid having from 6 to 12 carbon atoms and have a low mass, i.e. an $\overline{M}_n$ of 400 to 1000. By way of example, of an alpha, omega-aminocarboxylic acid, mention may be made of aminoundecanoic and aminododecanoic acid. By way of example of a dicarboxylic acid, mention may be made of adipic acid, sebacic acid and dodecanedioic acid HOOC—$(CH_2)_{10}$—COOH.

By way of example of a lactam, mention may be made of caprolactam and lauryllactam.

Caprolactam should be avoided unless the polyamide is purified of the caprolactam monomer which remains dissolved in it.

Polyamide blocks obtained by the condensation of lauryllactam in the presence of adipic acid or of dodecanedioic acid and a mass $\overline{M}n$ of 750 have a melting point of 127–130° C.

According to a second preferred embodiment of the invention, the polyamide blocks result from the condensation of at least one alpha,omega-aminocarboxylic acid (or a lactam), at least one diamine and at least one dicarboxylic acid. The alpha,omega-aminocarboxylic acid, the lactam and the dicarboxylic acid may be chosen from those mentioned above.

The diamine may be an aliphatic diamine having from 6 to 12 carbon atoms, it may be an aryl diamine.

By way of examples, mention may made of hexamethylenediamine, piperazine, isophorone diamine (IPD), methyl pentamethylenediamine (MPDM), bis(aminocyclohexyl)methane (BACM), bis(3-methyl-4-aminocyclohexyl)methane (BMACM).

The various constituents of the polyamide block and their proportion are chosen in order to obtain a melting point of less than 135° C. and advantageously of between 90 and 135° C.

Caprolactam should be avoided unless the polyamide is purified of the caprolactam which remains dissolved in it.

By way of examples of polyamide blocks, mention may be made of the following:

a) 6,6/Pip. 10/12 in which 6,6 denotes hexamethyleneadipamide (hexamethylenediamine condensed with adipic acid) units;

Pip. 10 denotes units resulting from the condensation of piperazine with sebacic acid;

12 denotes units resulting from the condensation of lauryllactam.

The proportions by weight are respectively:

25 to 35/20 to 30/20 to 30, the total being 80 and advantageously 30 to 35/22 to 27/22 to 27, the total being 80.

For example, the proportions 32/24/24 result in a melting point of 122 to 137° C.

b) 6,6/6,10/11/12 in which 6,6 denotes hexamethylenediamine condensed with adipic acid;

6,10 denotes hexamethylenediamine condensed with sebacic acid;

11 denotes units resulting from the condensation of aminoundecanoic acid;

12 denotes units resulting from the condensation of lauryllactam.

The proportions by weight are respectively:

10 to 20/15 to 25/10 to 20/15 to 25, the total being 70, and advantageously:

12 to 16/18 to 25/12 to 16/18 to 25, the total being 70.

For example, the proportions 14/21/14/21/result in a melting point of 119 to 131° C.

The hydrophilic blocks are polyether diols having a proportion of —($C_2H_4$—O)— units sufficient to make them hydrophilic and advantageously at least 50% by weight.

The polyether blocks may include units other than those of ethylene oxide, for example propylene oxide units or —($CH_2$)$_4$—O)— units.

The blocks are advantageously polyethylene glycol (PEG) blocks.

The copolymers of the invention may also include PPG (polypropylene glycol) blocks or PTMG (polytetramethylene glycol) blocks provided that there is a sufficient proportion of PEG blocks or blocks having a proportion of —($C_2H_4$—O)— units sufficient for the copolymers of the invention, once converted into film or coated onto a nonwoven, are impermeable-breathable. Advantageously, the impermeable-breathable character measured by the water-vapour permeability according to the ASTM E 96 BW standard is greater than 1000 and preferably between 2000 and 15,000 g/m$^2$/24 h.

Advantageously, the polyether blocks are PEG blocks with a mass $\overline{M}n$ of 100 to 6000 and preferably of 500 to 3000.

The amount of polyether blocks represents 10 to 40% by weight of the copolymer of the invention.

Particularly advantageous copolymers are:

those having polyamide-12 (polylauryllactam) blocks with a mass $\overline{M}n$ of 750 and PEG blocks with an $\overline{M}n$ of 1500 or 1000;

those having 6,6/Pip. 10/12 polyamide blocks described above in a) and PEG blocks with a mass $\overline{M}n$ of 600;

those having 6,6/6,10/11/12 polyamide blocks described above at b) and PEG blocks with a $\overline{M}n$ of 600.

The copolymers of the invention may be prepared by any means allowing the polyamide blocks and the polyether blocks to be linked together. In practice, essentially two processes are used, one being called a two-step process and the other a one-step process.

The two-step process firstly consists in preparing the polyamide blocks having carboxylic end groups by condensation of polyamide precursors in the presence of a chain-limiting dicarboxylic acid and then, in a second step, in adding the polyether and a catalyst. If the polyamide precursors are only lactams or alpha,omega-aminocarboxylic acids, a dicarboxylic acid is added. If the precursors already comprise a dicarboxylic acid, this is used in excess with respect to the stoichiometry of the diamines. The reaction usually takes place between 180 and 300° C., preferably 200 to 260° C., the pressure in the reactor stabilizes between 5 and 30 bar and maintained for approximately 2 hours. The pressure is slowly reduced, by venting the reactor, and then the excess water is distilled off, for example for one hour or two.

Having prepared the polyamide with carboxylic acid end groups, the polyether and a catalyst are then added. The polyether may be added in one or more goes, as may the catalyst. According to one advantageous embodiment, the polyether, is firstly added, the reaction of the OH end groups of the polyether with the COOH end groups of the polyamide starts with the formation of ester linkages and the elimination of water; the water of the reaction mixture is eliminated as far as possible by distillation and then the catalyst is introduced in order to complete the linking of the polyamide blocks to the polyether blocks. This second step is carried out with stirring, preferably under a vacuum of at least 5 mmHg (650 Pa) at a temperature such that the reactants and the copolymers obtained are in the melt. By way of example, this temperature may be between 100 and 400° C. and usually between 200 and 300° C. The reaction is monitored by measuring the torsional couple exerted by the molten polymer on the stirrer or by measuring the electric power consumed by the stirrer. The end of the reaction is determined by the value of the couple or the target power. The catalyst is defined as being any product allowing the polyamide blocks to be linked to the polyether blocks by esterification. The catalyst is advantageously a derivative of a metal (M) chosen from the group formed by titanium, zirconium and hafnium.

By way of example of a derivative, mention may be made of tetraalkoxides which satisfy the general formula M(OR)$_4$, in which M represents titanium, zirconium or hafnium and the Rs, which are identical or different, denote linear or branched alkyl radicals having from 1 to 24 carbon atoms.

The $C_1$ to $C_{24}$ alkyl radicals from among which the radicals R of the tetraalkoxides used as catalysts in the process according to the invention are chosen are, for example, such as methyl, ethyl, propyl, isopropyl, butyl, ethylhexyl, decyl, dodecyl and hexadodecyl. The preferred catalysts are the tetraalkoxides for which the radicals R, which are identical or different, are $C_1$ to $C_8$ alkyl radicals. Examples of such catalysts are, in particular, $Z_r$ (OC$_2$H$_5$)$_4$, Zr (O-isoC$_3$H$_7$)$_4$, Zr(OC$_4$H$_9$)$_4$, Zr(OC$_5$H$_{11}$)$_4$, Zr(OC$_6$H$_{13}$)$_4$, Hf(OC$_2$H$_5$)$_4$, Hf(OC$_4$H$_9$)$_4$ and Hf(O-isoC$_3$H$_7$)$_4$.

The catalyst used in this process according to the invention may consist only of one or more of the tetraalkoxides of formula M(OR)$_4$ defined above. It may also be formed by the combination of one or more of these tetraalkoxides with one or more alkali or alkaline-earth metal alkoxides of formula (R$_1$O)$_p$Y in which R$_1$ denotes a hydrocarbon residue, advantageously a $C_1$ to $C_{24}$, and preferably $C_1$ to $C_8$, alkyl residue, Y represents an alkali or alkaline-earth metal and p is the valency of Y. The amounts of alkali or alkaline-earth metal alkoxide and of zirconium or hafnium tetraalkoxides which are combined in order to form the mixed catalyst may vary over wide limits. However, it is preferred to use amounts of alkoxide and of tetraalkoxides such that the molar proportion of alkoxide is approximately equal to the molar proportion of tetraalkoxide.

The proportion of catalyst by weight, that is to say of the tetraalkoxide or tetraalkoxides when the catalyst does not contain an alkali or alkaline-earth metal alkoxide, or else of the combination of the tetraalkoxide or tetraalkoxides and the alkali or alkaline-earth metal alkoxide or alkoxides, when the catalyst is formed by the combination of these two types of compounds, advantageously varies from 0.01 to 5% of the weight of the mixture of the dicarboxylic polyamide with the polyoxyalkylene glycol and preferably lies between 0.05 and 2% of this weight.

By way of example of other derivatives, mention may also be made of salts of the metal (M), particularly the salts of (M) and of an organic acid and the complex salts between the oxide of (M) and/or the hydroxide of (M) and an organic acid. Advantageously, the organic acid may be formic acid, acetic acid, propionic acid, butyric acid, valeric acid, caproic acid, caprylic acid, lauric acid, myristic acid, palmitic acid, stearic acid, oleic acid, linolic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic and propionic acids are particularly preferred. Advantageously, M is zirconium. These salts may be called zirconyl salts. The Applicant believes, without being tied to this explanation, that these salts of zirconium and an organic acid or the complex salts mentioned above release $ZrO^{++}$ during the process. The product sold under the name zirconyl acetate is used. The amount to be used is the same as for the $M(OR)_4$ derivatives.

This process and these catalysts are described in Patents U.S. Pat No. 4,332,920, U.S. Pat. No. 4,230,838, U.S. Pat. No. 4,331,786, U.S. Pat. No. 4,252,920, JP 07145368A, JP 06287547A and EP 613919.

The present invention also relates to this two-step process for preparing copolymers having polyamide blocks and hydrophilic blocks with a melting point of less than 135° C. and which were described above in the multilayer structure, in which process the catalyst is a salt of the metal (M) chosen from the group of salts of (M) and of an organic acid and of complex salts between the oxide of (M) and/or the hydroxide of (M) and an organic acid. Advantageously (M) is zirconium. Preferably, the catalyst is zirconyl acetate.

With regard to the one-step process, all the reactants used in the two-step process, i.e. the polyamide precursors, the chain-limiting dicarboxylic acid, the polyether and the catalyst are mixed. These are the same reactants and the same catalyst as in the two-step process described above. If the polyamide precursors are only lactams, it is advantageous to add a little water.

The copolymer has essentially the same polyether blocks and the same polyamide blocks, but also a small portion of the various reactants that have reacted in a random fashion and are distributed randomly along the polymer chain.

The reactor is closed and heated, with stirring, as in the first step of the two-step process described above. The pressure stabilizes between 5 and 30 bar. When it no longer changes, the reactor is put under a reduced pressure, while maintaining vigorous stirring of the molten reactants. The reaction is monitored as before, in the case of the two-step process.

The catalyst used in the one-step process is preferably a salt of the metal (M) and of an organic acid, or a complex salt between the oxide of (M) and/or the hydroxide of (M) and an organic acid.

The present invention also relates to this one-step process for preparing copolymers having polyamide blocks and hydrophilic blocks with a melting point of less than 135° C. and which are described above in the multilayer structure, in which process the catalyst is a salt of the metal (M) chosen from the group of salts of (M) and of an organic acid and of complex salts between the oxide of (M) and/or the hydroxide of (M) and an organic acid. Advantageously (M) is zirconium. Preferably, the catalyst is zirconyl acetate.

The present invention also relates to certain copolymers having polyamide blocks and hydrophilic blocks of the multilayer structure described above and more particularly those which do not contain units coming from caprolactam or from the corresponding amino acid.

U.S. Pat. No. 5,489,667 has described copolymers having polyamide blocks (i), produced from caprolactam and aminoundecanoic acid and from the reaction of hexamethylenediamine on adipic acid, and PEG blocks (ii). These copolymers having a melting point of between 90 and 130° C. are useful as HMA-type adhesives (or hot-melt adhesives), that is to say they are deposited in the melt on the surfaces to be bonded and then the adhesion is obtained when they return to the solid state by cooling.

The Applicant has found that if caprolactam (or the corresponding amino acid) is used for preparing the polyamide blocks in the copolymers of the structures of the invention, it is very difficult to eliminate the caprolactam (or the corresponding amino acid) that has not polymerized in the polyamide block. When the copolymer is melted in order to cover the material and form the multilayer structure of the invention, caprolactam vapour, which has an unpleasant smell, is released. The Applicant has discovered that although the prior art always teaches the use of caprolactam (or of the corresponding amino acid) for these copolymers, it is not in fact necessary to use it.

The present invention relates to the copolymers having polyamide blocks and polyether blocks resulting from the chain-linkage of polyamide blocks having carboxylic end groups to polyether diols, these copolymers have a melting point between 90 and 135° C. and the polyamide blocks result from the condensation of one or more alpha,omega-aminocarboxylic acids and/or of one or more lactams having from 10 to 12 carbon atoms in the presence of a dicarboxylic acid having from 6 to 12 carbon atoms. These polyamide blocks have a low mass $\overline{M}n$, i.e. between 400 and 1000.

Advantageously, the polyamide blocks result from the condensation of a polyamide precursor chosen from aminoundecanoic acid, aminododecanoic acid and lauryllactam in the presence of adipic acid, azelaic acid, sebacic acid or dodecanedioic acid.

The present invention also relates to the copolymers having polyamide blocks and polyether blocks resulting from the chain-linkage of polyamide blocks having carboxylic end groups to polyether diols; these copolymers have a melting point of between 90 and 135° C. and the polyamide blocks result from the condensation:

of one or more diamines with one or more dicarboxylic acids each having from 6 to 12 carbon atoms;

of at least one lactam and/or one alpha,omega-aminocarboxylic acid having from 10 to 12 carbon atoms;

at least one of the dicarboxylic acids being in excess.

In these copolymers having polyamide blocks and polyether blocks, the lactam and/or the alpha,omega-aminocarboxylic acid is advantageously chosen from aminoundecanoic acid, aminododecanoic acid and lauryllactam.

Mention may be made, for example, of the blocks a) and b) mentioned above, namely:
a) 6,6/Pip. 10/12
b) 6,6/6,10/11/12 and the blocks 6,6/12/11/6,9/6,12, in which:
6,9 denotes the condensation of hexamethylenediamine with azelaic acid;
6,12 denotes the condensation of hexamethylenediamine with dodecanedioic acid.

These copolymers result from the chain-linkage of polyamide blocks having carboxylic end groups to polyether diol blocks.

The polyether diol blocks are those described above, preferably they are polyethylene glycol (PEG) blocks.

These polymers deposited on the material and forming part of the multilayer structure of the invention are also useful as adhesives.

It is not always desirable, or possible, to cover materials with the copolymers of the invention in the melt. For example, with these adhesives, breathing films may be adhesively bonded to leather and to cotton or polyester wovens. These are adhesives of the HMA type (or hot-melt adhesives), that is to say they are deposited in the molten state on the surfaces to be adhesively bonded and then the adhesion is obtained when they return to the solid state by cooling. Thus, the presence of the adhesive does not produce the breathability since it is itself impermeable-breathable by virtue of the PEG blocks. If, however, a breathable film is adhesively bonded to a nonwoven using a non-breathable adhesive, the breathability of the assembly is greatly reduced, depending on the density of the spots of adhesive.

The present invention also relates to the hot-melt adhesives consisting of the novel copolymers not having caprolactam in the polyamide blocks.

EXAMPLE 1

Introduced into a 6-litre reactor are 661 g of dicarboxylic polyamide 12 having an average molecular mass of 750 g/mol, prepared beforehand by the polycondensation of lauryllactam in the presence of adipic acid. Next, 838 g of dihydroxylated polyoxyethylene (PEG) having a molecular mass of 1000 g/mol and then 1.5 g of $Zr(OC_4H_9)_4$ are added.

The mixture thus formed is put under an inert atmosphere and heated until the temperature reaches 240° C.

The reactor is then put under reduced pressure, while maintaining vigorous stirring as soon as the reactants melt. The reaction is continued at 240° C. under 1 torr (130 Pa) for a period of 1 hour.

The product obtained has an inherent viscosity of 1.39 dl/g. It has a crystalline melting point at 133° C. in differential thermal analysis.

EXAMPLE 2

Introduced into a 6-litre reactor are 451 g of 12-aminododecanoic acid, 102 g of adipic acid and 1000 g of dihydroxylated polyoxyethylene having an average molecular mass of 1500 g/mol.

The mixture thus formed is put under an inert atmosphere and heated until the temperature; reaches 240° C., while maintaining vigorous stirring, as, soon as the reactants melt. The mixture is left to react for 2 hours and then the water created is distilled off. Next, 4.5 g of $Zr(OC_4H_9)_4$ in 7.5 g of $CH_2Cl_2$ are introduced and the reactor is put under reduced pressure, maintaining stirring.

The reaction is continued at 220° C. under 1 torr (130 Pa) for a period of 2 hours.

The product obtained has an inherent viscosity of 1.41 dl/g. It has a crystalline melting peak at 135° C. in differential thermal analysis.

EXAMPLE 3

Introduced into a 6-litre reactor are 391 g of 12-lactam, 158.84 g of dodecanoic acid, 35 g of water, 1500 g of dihydroxylated polyoxyethylene having an average molecular mass of 1500 g/mol and 7.8 ml of a zirconyl acetate solution in water/acetic acid (0.625% total loading of zirconyl acetate).

The mixture thus formed is put under an inert atmosphere and heated until the temperature reaches 270° C., while maintaining vigorous stirring, as soon as the reactants melt, for 3 hours, after which the pressure, which is then 30 bar, is then released. When atmospheric pressure is reached, the reactor is put under a reduced pressure of 1 torr (130 Pa). The reaction is continued for a period of 2 hours.

The product obtained has an inherent viscosity of 1.27 dl/g. It has a crystalline melting peak at 135° C. in differential thermal analysis.

EXAMPLE 4

Introduced into a 6-litre reactor are 391 g of 12-lactam, 179 g of dodecanoic acid, 35 g of water, 1500 g of dihydroxylated polyoxyethylene having an average molecular mass of 1500 g/mol and 9.4 ml of zirconyl acetate solution in water/acetic acid (0.625% total loading of zirconyl acetate).

The mixture thus formed is put under an inert atmosphere and heated until the temperature reaches 270° C., while maintaining vigorous stirring, as soon as the reactants melt, for 3 hours, after which the pressure, which is then 30 bar, is then released. When atmospheric pressure is reached, the reactor is put under a reduced pressure of 1 torr (130 Pa). The reaction is continued for a period of 2 hours.

The product obtained has an inherent viscosity of 1.27 dl/g. It has a crystalline melting peak at 102° C. in differential thermal analysis.

EXAMPLE 5

Preparation of the 6,6/6,10/12/PEG.600 copolymer in the proportions 14/14/42/30.

The following monomers are introduced into an autoclave which is fitted with a stirrer: 16,800 g of lauryllactam, 3557 g of sebacic acid (C10), 5408 g of adipic acid and 6188 g of hexamethylenediamine (in the form of a 73.1% solution in water).

The mixture thus formed is put under an inert atmosphere and heated until the temperature reaches 290° C., while maintaining vigorous stirring, as soon as the reactants melt. A temperature of 290° C. and a pressure of 25 bar are maintained for 2 hours (precondensation). Next, the pressure is slowly (1.25 h) reduced from 25 bar to atmospheric pressure and the temperature from 290 to 245° C. A fine dispersion of 9711 g of dihydroxylated polyoxyethylene ($M_n$=600) and 70 g of a zirconyl acetate solution in water/acetic acid (0.625% total loading of the zirconyl acetate; $pH_{solution}$=3.0–3.5) are now introduced.

The mixture obtained is put under reduced pressure of ca. 30 mbar. The reaction is continued for a period of 3 hours. The product is extruded into a water bath and granulated. The product obtained has an inherent viscosity of 1.12 dl/g; melting point (determined optically): 120–130° C.

EXAMPLE 6

The permeability of a 40 µm thick film of composition 6/11/6,12/PEG in proportions 21/21/18/40 is 12,000 g/m²/24 h according to ASTM E 96 BW.

What is claimed is:

1. Multilayer structure comprising a material wherein the material is paper, board, a nonwoven comprising cellulose fibres, a nonwoven comprising polyolefin fibres or a woven chosen from cotton, polyamide or polyester covered with a copolymer having polyamide blocks with the proviso that the polyamide blocks are not condensed from caprolactam and hydrophilic blocks wherein the hydrophilic blocks of the copolymer are polyethers having at least 50% by weight of —($C_2H_4$—O)— units, the copolymer having a melting point of less than 135° C.; wherein the structure is a barrier to water and permeable to water vapor.

2. Structure claim 1, in which the amount of polyether blocks of the copolymer represents 10 to 40% by weight of the copolymer.

3. Structure according claim 1, in which the polyamide blocks of the copolymer result from the condensation of one or more alpha,omega-aminocarboxylic acids and/or one or more lactams having from 6 to 12 carbon atoms in the presence of a dicarboxylic acid having from 6 to 12 carbon atoms, the polyamide blocks having a mass $\overline{M}n$ of 400 to 1000.

4. Structure according to claim 1, in which the polyamide blocks of the copolymer result from the condensation of at least one alpha,omega-aminocarboxylic acid or of a lactam, at least one diamine and at least one dicarboxylic acid.

5. Process for preparing a structure according to claim 3, in which (i) in a first step, the polyamide blocks are prepared by condensation of polyamide precursors in the presence of a chain-limiting dicarboxylic acid and then (ii), in a second step, the polyether and a catalyst, which is a salt of metal (M) chosen from the group of salts of (M) and of an organic acid and of complex salts between the oxide of (M) and/or the hydroxide of (M) and an organic acid, are added.

6. Process for preparing a structure according to claim 1, in which the polyamide precursors, a chain-limiting dicarboxylic acid, the polyether and a catalyst, which is a salt of metal (M) chosen from the group of salts of (M) and of an organic acid and of complex salts between the oxide of (M) and/or the hydroxide of (M) and an organic, are mixed.

7. Process according to claim 5, in which (M) is chosen from titanium, zirconium and hafnium.

8. Process according to claim 7, in which (M) is zirconium.

9. Process according to claim 5, in which the catalyst is zirconyl acetate.

10. A structure according to claim 1, wherein the copolymer has a melting point of 90–135° C.

11. A process for preparing a structure according to claim 4, wherein (i) the polyamide blocks are prepared by condensation of polyamide precursors in the presence of a chain-limiting dicarboxylic acid and then (ii) the polyether and a catalyst, which is a salt of metal (M) chosen from the group of salts of (M) and of an organic acid and of complex salts between the oxide of (M) and/or the hydroxide of (M) and an organic acid, are added.

12. A process for preparing a structure according to claim 4, wherein the polyamnide precursors, a chain-limiting dicarboxylic acid, the polyether and a catalyst, which is a salt of metal (M) chosen from the group of salts of (M) and of an organic acid and of complex salts between the oxide of (M) and/or the hydroxide of (M) and an organic, are mixed.

13. Process according to claim 11, in which (M) is chosen from titanium, zirconium and hafnium.

14. Process according to claim 13, in which (M) is zirconium.

15. Process according to claim 11, in which the catalyst is zirconyl acetate.

16. Structure according to claim 4 wherein the lactam or the alpha, omega-aminocarboxylic acid is chosen from aminoundecanoic acid, aminododecanoic acid and lauryllactam.

17. A copolymer having polyamide blocks and polyether blocks resulting from the chain-linkage of polyamide blocks having carboxylic acid end groups to polyether diols wherein the polyether diols are polyethylene glycol, having a melting point of between 90 and 135° C. in which the polyamide blocks result from the condensation of one or more alpha, omega-aminocarboxylic acids and/or one or more lactams having from 10 to 12 carbon atoms in the presence of a dicarboxylic acid having from 6 to 12 carbon atoms with the proviso that the polyamide blocks are not condensed from caprolactam or the corresponding amino acid, and in which the mass $M_n$ of the polyamide blocks is between 400 and 1000.

18. A copolymer according to claim 17, in which the lactam and/or the alpha, omega-aminocarboxylic acid having from 10 to 12 carbon atoms is chosen from aminoundecanoic acid, aminododecanoic acid and lauryllactam.

19. A copolymer according to claim 18, having 6,6/Pip.10/12 polyamide blocks, in which:

6,6 denotes units resulting from the condensation of hexamethylenediamine with adipic acid;

Pip. 10 denotes units resulting from the condensation of piperazine with sebacic acid;

12 denotes units resulting from the condensation of lauryllactam.

20. A copolymer according to claim 18, having 6,6/6,12/11/12 polyamide blocks in which:

6,6 denotes units resulting from the condensation of hexamethylenediamine with adipic acid;

6,12 denotes units resulting from the condensation of hexamethylenediamine with dodecanedioic acid;

11 denotes units resulting from the condensation of aminoundecanoic acid;

12 denotes units resulting from the condensation of lauryllactam.

21. A copolymer having polyamide blocks and polyether blocks resulting from the chain-linkage of polyamide blocks having carboxylic end groups to polyether diols wherein the polyether diols are polyethylene glycol, these copolymers having a melting point of between 90 and 135° C. and in which the polyamide blocks result from the condensation:

of one or more diamines with one or more dicarboxylic acids each having from 6 to 12 carbon atoms;

of at least one lactam and/or one alpha, omega-aminocarboxylic acid having from 10 to 12 carbon atoms;

at least one of the dicarboxylic acids being in excess, with the proviso that the polyamide blocks are not condensed from caprolactam.

22. A copolymer according to claim 21, wherein the lactal and/or the alpha, omega-amnocarboxylic acid having from 10 to 12 carbon atoms is chosen from aminoundecanoic acid, aminododecanoic acid and lauryllactam.

23. Hot-melt adhesive comprising a copolymer having polyamide blocks and polyether blocks resulting from the chain-linkage of polyamide blocks having carboxylic acid end groups to polyether diols wherein the polyether diols are polyethylene glycol, having a melting point of between 90 and 135° C. in which the polyamide blocks result from the condensation of one or more alpha, omega-aminocarboxylic acids and/or one or more lactams having from 10 to 12 carbon atoms in the presence of a dicarboxylic acid having from 6 to 12 carbon atoms with the proviso that the polyamide blocks are not condensed from caprolactam, and in which the mass $M_n$ of the polyamnide blocks is between 400 and 1000.

24. Hot-melt adhesive according to claim 23 wherein the lactam and/or the alpha, omega-aminocarboxylic acid having from 10 to 12 carbon atoms is chosen from aminoundecanoic acid, aminododecanoic acid and lauryllactam.

* * * * *